United States Patent [19]

Kotzin et al.

[11] Patent Number: 5,442,681
[45] Date of Patent: Aug. 15, 1995

[54] METHOD OF EXCHANGING COMMUNICATED SIGNALS BETWEEN A REMOTE BASE SITE AND A CENTRAL SITE IN A COMMUNICATION SYSTEM

[75] Inventors: Michael D. Kotzin; Valy Lev, both of Buffalo Grove; Stephen L. Spear, Skokie, all of Ill.

[73] Assignee: Motorola Inc., Schaumburg, Ill.

[21] Appl. No.: 55,342

[22] Filed: May 3, 1993

Related U.S. Application Data

[62] Division of Ser. No. 764,873, Sep. 24, 1991, abandoned.

[51] Int. Cl.⁶ ............................................. H04Q 7/20
[52] U.S. Cl. ...................................... 379/59; 455/15; 455/33.1; 455/34.1; 455/56.1
[58] Field of Search ............... 379/58, 59; 455/33.1, 455/51.1, 34.1, 34.2, 15, 16, 17, 54.1, 56.1

[56] References Cited

U.S. PATENT DOCUMENTS

| | | | |
|---|---|---|---|
| 4,644,534 | 2/1987 | Sperlich | 370/95 |
| 4,742,514 | 5/1988 | Goode et al. | 370/109 |
| 4,748,655 | 5/1988 | Thrower et al. | 379/58 |
| 4,759,051 | 7/1988 | Han | 379/59 |
| 4,794,649 | 12/1988 | Fujiwara | 455/9 |
| 4,829,554 | 5/1989 | Barnes et al. | 379/58 |
| 4,890,315 | 12/1989 | Bendixen et al. | 379/59 |
| 4,972,456 | 11/1990 | Kaczmarek et al. | 379/59 |
| 5,038,342 | 8/1991 | Crisler et al. | 370/50 |
| 5,054,110 | 10/1991 | Comroe et al. | 455/33 |
| 5,081,704 | 1/1992 | Umeda et al. | 455/33 |
| 5,101,407 | 3/1992 | Harvey et al. | 370/95.3 |
| 5,101,501 | 3/1992 | Gilhousen et al. | 455/33 |
| 5,109,527 | 4/1992 | Akerberg | 455/33.2 |
| 5,117,502 | 5/1992 | Onoda et al. | 455/33.1 |
| 5,127,100 | 6/1992 | D'Amico et al. | 455/33.1 |
| 5,203,010 | 4/1993 | Felix et al. | 455/33.2 |

FOREIGN PATENT DOCUMENTS

0169726A3 1/1986 European Pat. Off. .
2241850A 9/1991 United Kingdom .

*Primary Examiner*—Dwayne D. Bost
*Attorney, Agent, or Firm*—Daniel C. Crilly; Richard A. Sonnentag

[57] ABSTRACT

A communication system employs a method for exchanging communicated signals between a remote base site (e.g., 63) and a central site (205) on a communication resource (e.g., 77) assigned to the remote base site (63). The central site (205) or the remote base site (63) determines that a signal must be exchanged between the remote base site (63) and the central site (205). The remote base site (63) then allocates the communication resource (77) for exchanging the signal from those communication resources (e.g., 76 and 77) assigned to the remote base site (63) for exchanging signals with communication units (e.g., 18) in the service coverage area (53) of the remote base site (63).

7 Claims, 5 Drawing Sheets

METHOD OF EXCHANGING COMMUNICATED SIGNALS BETWEEN A REMOTE BASE SITE AND A CENTRAL SITE IN A COMMUNICATION SYSTEM

This is a division of application Ser. No. 07/764,873, filed on Sep. 24, 1991, now abandoned.

FIELD OF THE INVENTION

This invention relates to communication systems and more specifically to cellular communication systems.

BACKGROUND OF THE INVENTION

Cellular communication systems are known. Such systems are, typically, comprised of a number of cells, each having a service coverage area, and a number of cellular telephones (communication units). The service coverage areas of adjacent cells may be arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) and incorporated herein by reference, is an example of just such a system.

A cell's radio coverage is provided by a base transceiver station (BTS). Each BTS may contain one or more transceivers (TRX) which can simultaneously receive on one frequency and transmit on another. Communication between a BTS and a mobile communication unit (or mobile station) (MS) typically occurs using a portion of a pair of frequencies (transmit and receive) temporarily assigned in support of the communication transaction at the BTS.

The pair of frequencies assigned for use at the remote site are typically referred to as a radio channel. Downlink transmissions (from BTS to MS) on the radio channel occur on a first frequency of the pair of frequencies. Uplink transmissions (from MS to BTS) on the radio channel occurs on the second frequency of the pair of frequencies.

The GSM system is a TDM/TDMA system providing eight full duplex signal paths (8 TDM slots per TDM frame) on each radio channel. A single, primary radio channel assigned to a BTS, by virtue of its being time multiplexed, can support up to seven full rate duplex traffic users (speech or data) in addition to a multiplexed common control channel within the eight TDM slots. Additional, secondary radio channels assigned to the same cell can provide a full complement of eight full rate traffic users (in the 8 TDM slots) per radio channel, since the control channel within the primary radio channel can control allocation of communication resources on secondary radio channels.

Transmissions (control or speech and/or data traffic) from a BTS to an MS, on the downlink, occupy a first TDM slot (downlink slot) on a first frequency of a radio channel and transmissions from a communication unit to a BTS, on the uplink, occupy a second TDM slot (uplink slot) on the second frequency of the radio channel. The uplink slot on the second frequency is displaced in time three TDM slot positions following the downlink slot on the first frequency. The uplink slot on the second frequency is offset 45 MHz lower in frequency than the downlink. The uplink slot and downlink slot (together providing a two-way signal path for a single user) may be referred to as a "communication resource", allocated by the BTS to an MS for exchanging signals. The term "communication resource" also typically includes an associated signalling channel, as for example the GSM specified slow associated control channel used with traffic channels.

Exchanges of paging and setup control information within GSM between MSs and BTSs typically occurs on the common control channel (CCCH) which occupies at least one slot of a primary channel of the BTS. Transmitted by the BTS on the CCCH are distinctive identification signals as well as synchronization and timing information common to all other frequencies and slots of the BTS. CCCH information allows an MS to differentiate between primary and non-primary channels.

System control attributes of a GSM-like system are quite complex and demanding. The operation is hinged to the existence of a primary channel being present for each BTS. Key system control functions such as cell selection and handover are based upon the primary channel. Mobiles select a serving BTS based upon signal measurements of primary channels of nearby BTSs. Handovers are achieved, in part, based upon primary channel signal measurements performed by a mobile and transferred to a serving BTS.

Upon activation, an MS scans a set of frequencies in search of CCCH identification signals transmitted from proximate BTSs. Upon detecting a CCCH identification signal the communication unit measures a signal quality factor (such as signal strength and/or bit error rate) of the identification signal as a means of determining relative proximity of the BTS. Upon completing the scan of frequencies within the set, the MS generally selects the BTS providing the largest relative signal quality factor, as a serving BTS. Upon identifying, and locking onto a suitably strong signal (and registering if necessary) the communication unit monitors the selected CCCH for incoming calls. Should the communication unit desire to initiate a call, an access request may be transmitted using the CCCH of the serving BTS.

During normal operation (including during active calls), the MS monitors for, identifies, and measures primary channels of nearby BTSs. If involved in an active call, the MS relays measurement information back to the base site on the SACCH. Through such a process, it is possible for the MS to maintain an association with the most appropriate BTS. During an inactive state the process may entail an autonomous switching by the MS to a different BTS, causing perhaps a re-registration by the MS with the system indicating that such a switch has occurred.

Alternatively, during an active communication exchange, the MS may be commanded by the system to handover to a more appropriate BTS.

Access by an MS to a local BTS may allow the MS telephony access to a communication target, such as another MS, served by the same, or another BTS, or to a subscriber within a public switched telephone network (PSTN). Access by the MS to a local BTS may also provide the MS access to a diversity of other data services.

In general, communication access is provided to the MS through a cellular infrastructure system which, in the case of a PSTN target, may include the BTS, a base station controller (BSC), a mobile switching center (MSC), and the PSTN network. Under GSM, a BSC may control a number of BTSs. An MSC, connected to the PSTN network, may control a number of BSCs.

The exchange of information within the infrastructure network of the GSM cellular system generally occurs over high speed (2.048 mb/s) transmission links, based upon CCITT standardized exchange protocol. Physical mediums used to facilitate these high speed links include wireline, coax, fiber optic, or microwave. Such links may be utilized, for example, to interconnect remote BTSs with a controlling BSC.

The use of high speed transmission links within the cellular infrastructure has been justified, in the past, by high capacity requirements due, in part, to the relatively large geographic areas covered by BTSs. High speed links, in other cases, have been justified by the highly variable nature of communication traffic through BTSs and by a desire for standardization.

While, in the past, high speed transmission links have worked well, the cost has not been justified in all applications. In some cases the cost of a high speed transmission link between a BTS and BSC is not justified by the communication traffic. BTSs serving rural areas may be lightly loaded and spaced at relatively large distances thereby increasing cost in areas least likely to need the capacity of such links. There is often also some difficulty providing such conventional links due to certain logistical problems. (e.g. a remote BTS site at the top of a light pole).

In urban areas, on the other hand, as cellular traffic has increased, the trend has been to divide cells into increasingly smaller cells (microcells). The use of microcells reduces the average distance between MS and BTS allowing for reduced transmission power (thereby increasing the viability of hand-held portables). Reducing average transmission power of communication exchanges allows for a greater number of users within a system by allowing closer reuse of communication resources.

Increasing the capacity of the system by reducing cell size may reduce the average traffic through microcell BTSs. Use of high speed links to interconnected BSCs with microcell BTSs, in such cases, may result in a significant mismatch of need to capacity with sever economic consequences.

As with the use of high speed links at the BTS, it has likewise been traditional in the past to include the capability for radio test diagnostic subsystems at each BTS site. The test subsystem provides MS emulation and is used, under control of an operations and maintenance center (OMC), to test the radios of the BTS, thereby insuring the integrity of the BTS and, through loopback testing, the overall network. The test subsystem, in the past, has been limited to internal test routines within the BTS and has been provided through the high speed link.

Because of the importance of microcells and of cellular service in rural areas, with little communication traffic, a need exists for an alternative to the high speed data links typically used to interconnect remote BTS sites to the remainder of the cellular infrastructure. Such an alternative should have the potential for working equally well in rural areas as in the microcell environment of urban or other relatively high traffic areas. Such an alternative should also provide a convenient and economical means of testing remote BTS sites.

SUMMARY OF THE INVENTION

A backbone communication system is offered for exchanging, on a TDMA channel, a number of communicated signals with a plurality of remote base sites. The system comprises at least one mobile function transceiver, transceiving on the TDMA channel and means for synchronizing a transceiver at each of the number of base sites to the at least one mobile function transceiver.

BRIEF DESCRIPTION OF A PREFERRED EMBODIMENT

The solution to the problems caused by wireline or microwave interconnects between remote base sites and the BSC lies, conceptually, in sharing communication resources assigned to a remote base site in support of communication transactions between the remote site and the BSC. In accordance with the invention the communication transactions occur on a backbone system comprised of the shared communication resources and a central controller.

The central site controller interconnects with the BSC and provides transceivers and control functions for requesting access from, and exchanging signals with, the remote base site on the shared communication resources. The shared resources are allocated from communication resources that otherwise would be available to user communication units located within the service coverage area of the remote base site.

Figure 4:
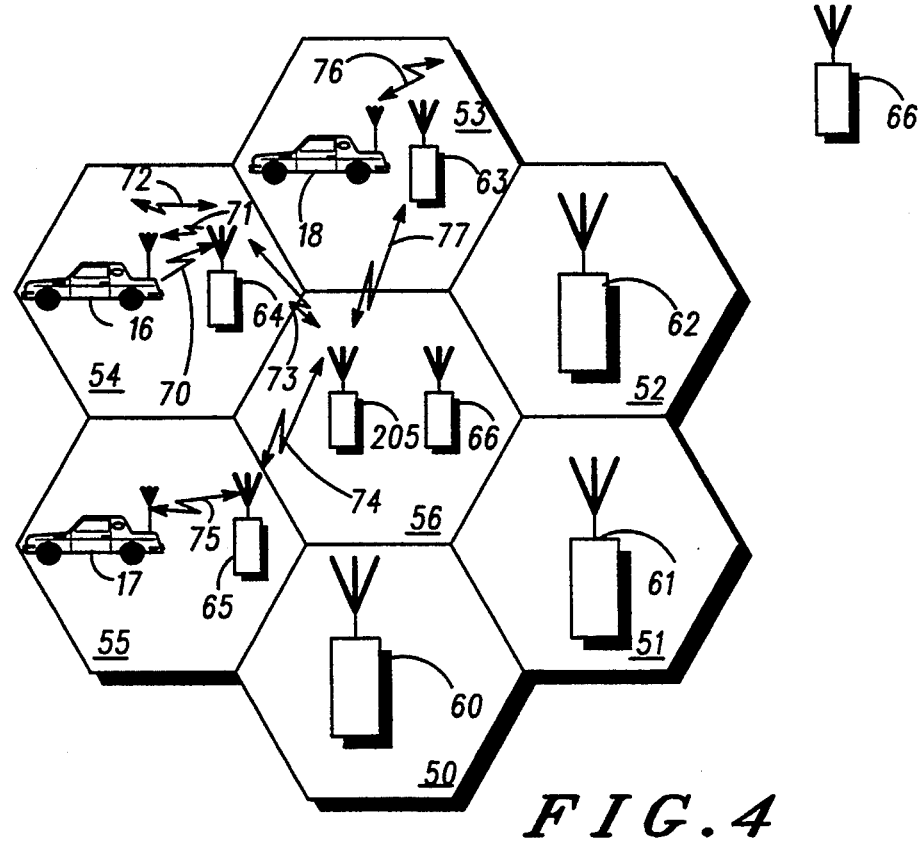
FIG. 4 depicts seven cells covered by a central site controller under the invention.

Shown in FIG. 4 are seven cells (50, 51, 52, 53, 54, 55, and 56) of a communication system under the invention. Included within each cell (50, 51, 52, 53, 54, 55, and 56) is a remote base site (60, 61, 62, 63, 64, 65, and 66) providing communication services within the service coverage area of each cell (50, 51, 52, 53, 54, 55, and 56).

Figure 8:
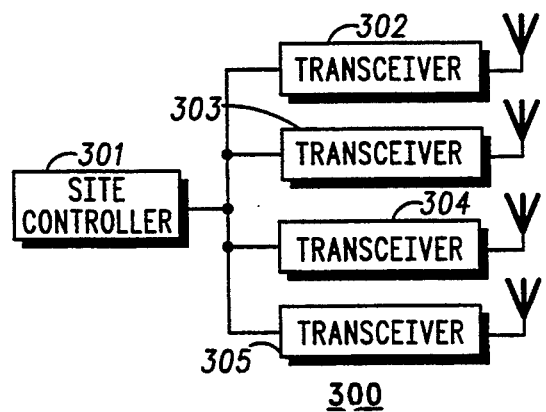
FIG. 8 comprises a remote base site under the invention.

Remote sites (60, 61, 62, 63, 64, 65, and 66) are constructed as shown in FIG. 8. FIG. 8 includes a site controller (301, FIG. 8) and transceivers (302 through 305).

Figure 1:
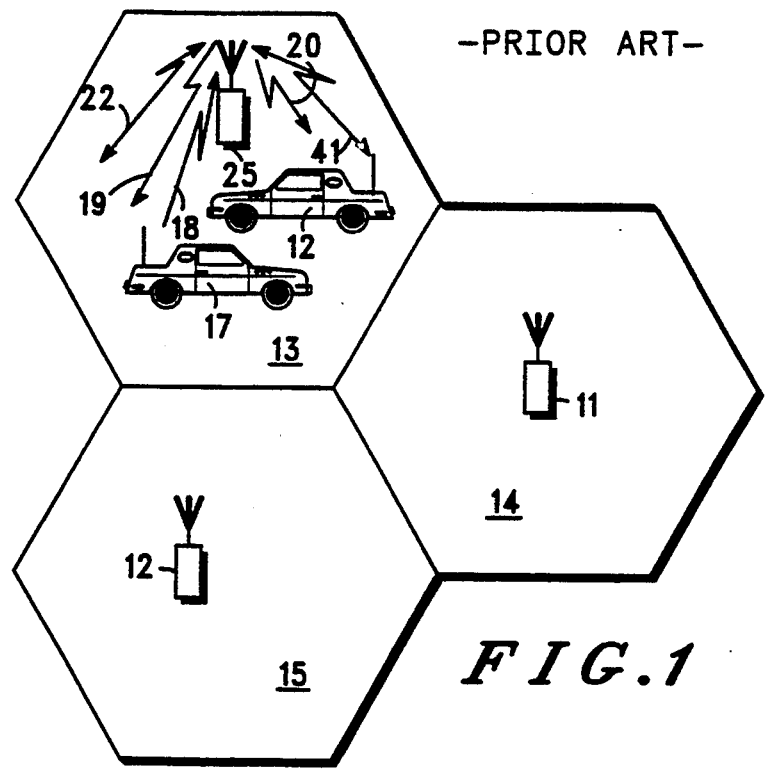
FIG. 1 depicts three cells of a communication system including two communication units under the prior art.
Figure 2:
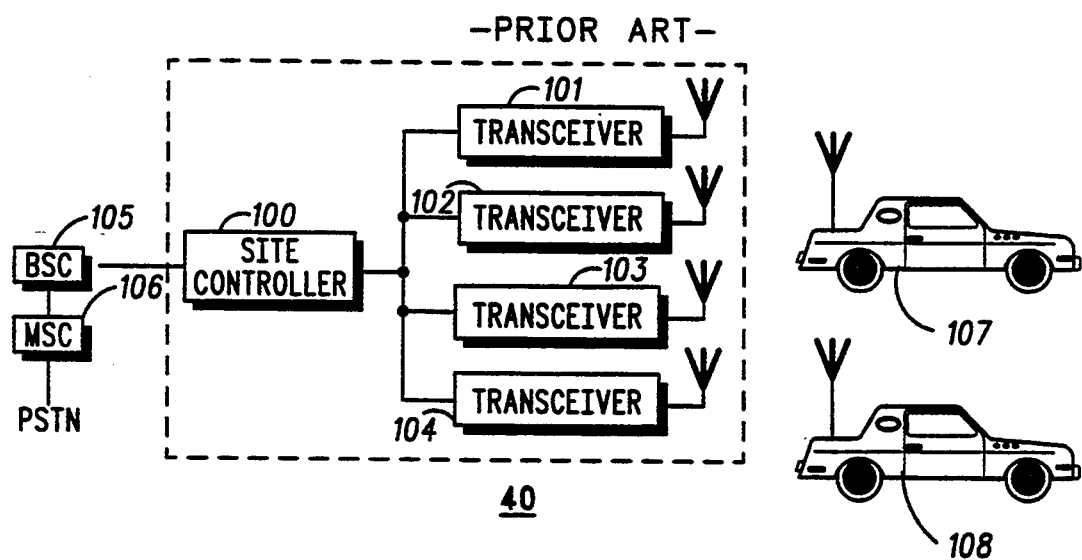
FIG. 2 comprises a block diagram of a remote site under the prior art.
Figure 3:
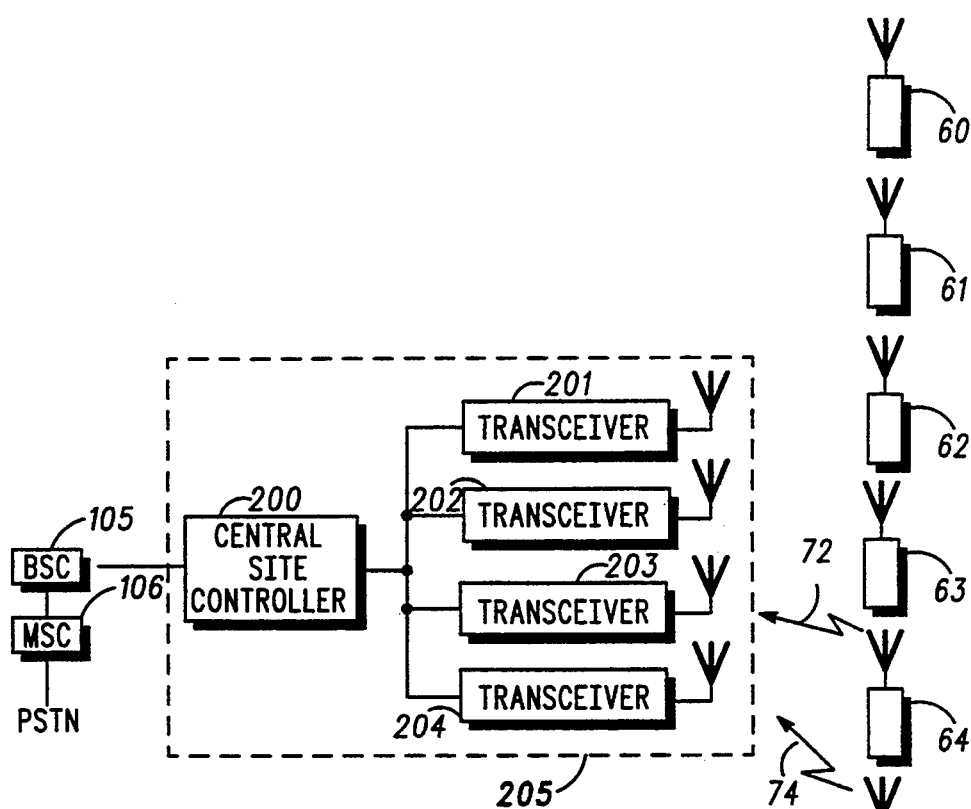
FIG. 3 comprises a block diagram of a central site including controller and transceivers under the invention.

FIG. 3 is a block diagram of a central site controller (central site) generally (205) under one embodiment of the invention. Included within the central site is a central site controller (200) and transceivers (201, 202, 203 and 204). The transceivers (201, 202, 203 and 204) are constructed to transmit as mobile function transceivers, under the same format as communication units (16 and 17) (transmit as communication unit transmitters and receive as communication unit receivers). The central site controller (200) is shown having an interconnect with a BSC.

Under one embodiment of the invention the central site (205) may be interconnected by wireline to a BSC (105) and MSC (106) and co-located with a remote site (66, FIG. 4). Under such an embodiment a means for exchanging control information with the remote base sites (60, 61, 62, 63, 64, or 65), such as a dedicated control link, may be necessary. A dedicated control link from central site (205) to each remote site (60, 61, 62, 63, 64, or 65) provides a means for communicating with remote base sites (60, 61, 62, 63, 64, or 65).

The dedicated control link selected, under the invention, is determined by the volume of control traffic required to support remote base site operation. The dedicated control link may be a TDM timeslot (0 through 7) on a primary or secondary channel assigned to a remote base site (60, 61, 62, 63, 64, or 65) or a portion of a TDM timeslot, such as a SDCCH channel or combination of SDCCH channels.

The control link is continuously maintained through a dedicated transceiver (201, 202, 203, or 204) for the exchange of communicated signals such as paging requests and authorizations of resource allocations to the remote sites (60, 61, 62, 63, 64, or 65). The dedicated transceiver (201, 202, 203, or 204), in turn, monitors the dedicated control link of the remote sites (60, 61, 62, 63, 64, or 65) for communicated signals such as resource requests and paging responses.

Message flows for resource requests and allocation of communication resources between communication units (16, 17, and 18) and remote base sites (60, 61, 62, 63, 64, 65, and 66), under the invention, may be processed consistent with ETSI GSM standards for intra-cellular communication transactions.

Inter-cellular communication transactions on a backbone system, under one embodiment of the invention, occur on at least one communication resource, such as a TCH, or DCCH, or SDCCH, assigned to a remote base site that is, in turn, shared between the remote base site (60, 61, 62, 63, 64, or 65) and the central site (205). Shared communication resources are requested by the remote base sites (60, 61, 62, 63, 64, or 65) or central site (205), with the central site controller (200) acting as a means for determining that a signal must be exchanged between the remote base site and the central site.

Figure 9:
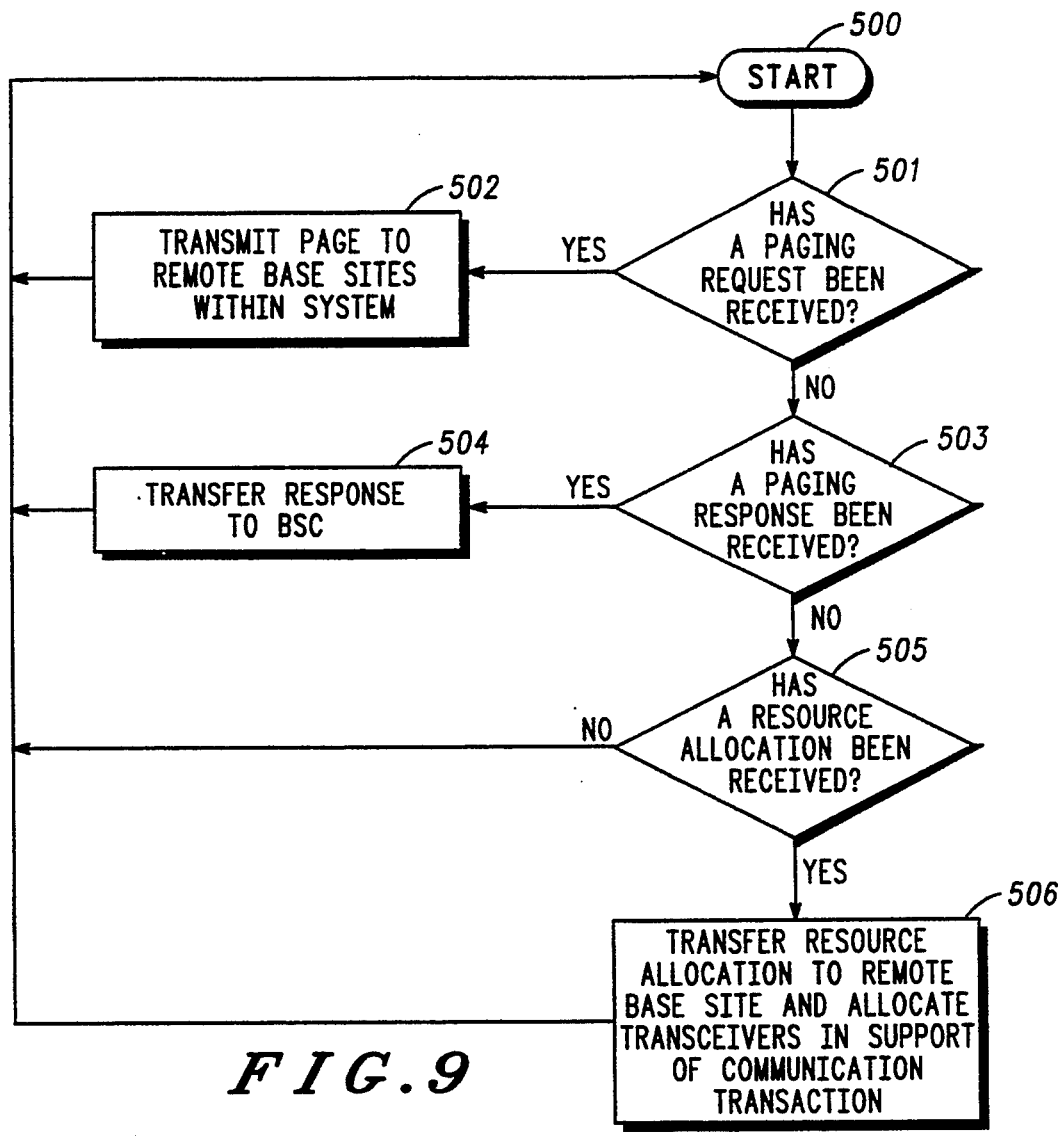
FIG. 9 comprises a flow chart of central site operation under the invention.
Figure 7:
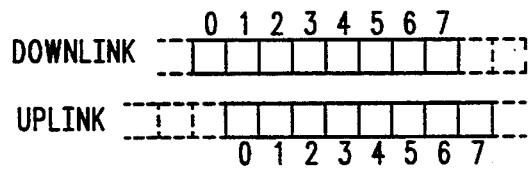
FIG. 7 depicts a single frame of a TDM transmission under the invention.

Shown in FIG. 9 is a flow chart of central site operation under the invention. Reference shall be made to FIG. 9 as required for understanding of the invention.

As an example of the invention the remote site (63) receives a resource request (76) from a requesting communication unit (18) for access to a PSTN subscriber (not shown). The remote site (63) transmits the request (77) to the central site (205) on the dedicated control link between the requesting remote base site (63) and the central site (205). The request (77) may contain an ID of the originating remote site (63), an ID of the requesting communication unit (18), and an ID of the PSTN target.

The central site controller (205) receives the request (77) (501) through a transceiver (203). The access request (77) is transferred by wireline to the BSC (105) and MSC (106) for processing. The request is processed within the BSC (105) and MSC (106), under the invention, consistent with prior art GSM standards. The BSC (105) and MSC (106), in due course, communicate the access request to the PSTN system.

The PSTN system responds by providing an interconnect authorization to the MSC (106) and an interconnect path to the PSTN target. The MSC (106) transfers the interconnect authorization to the BSC (105). The BSC (105), in response, generates a set of two resource allocations and transfers the resource allocations to the central site (205) for transfer to the remote base site (63). The central site (205) transmits (504) the set of resource allocations to the remote base sites on the dedicated control channel. The first resource allocation allows the requesting communication unit (18) to exchange a communicated signal with the remote base site (63) and the second resource allocation allows the central site (205) to exchange the communicated signal with the remote base site (63). The central site (205) allocates a transceiver (201) and a signal path (506) between the transceiver (201) and the PSTN subscriber.

In the case of a PSTN subscriber requesting access to a communication unit (16) a similar process is used. In this case an access request is transferred by wireline from the PSTN network to the MSC (106). The MSC (106), upon validating the request, generates and transfers a paging request to the BSC (106). The BSC (106) transfers the paging request to the remote base sites (60, 61, 62, 63, 64, or 65) via the dedicated control links. The remote base site (64) where the target communication unit (16) is located responds, also via the dedicated control link, with an acknowledgement (73). The acknowledgement is transferred to the MSC (106). The MSC (106) responds with an interconnect and interconnect authorization which is transferred both to the PSTN and to the BSC (105). The interconnect between PSTN subscriber and communication unit (16) is completed as above.

In another embodiment of the invention, control links between the central site (205) and remote base sites (60, 61, 62, 63, 64, or 65) are established on an as-needed basis, existing only for so long as control traffic exists between the remote base sites (60, 61, 62, 63, 64, or 65) and the central site (205). Under such an embodiment, and upon receipt of a resource request from a communication unit (16 or 17), the site controller (100) immediately transmits a page containing an ID recognized by the central site (205). The central site (205), upon recognizing the page, responds with a central site request for a set-up channel. The remote base site (60, 61, 62, 63, 64, or 65), upon receiving the central site request transmits a SDCCH channel grant on the CCCH. The central site (205) upon receipt of the channel grant tunes to the SDCCH channel and receives the resource request information and transmits resource authorizations, as above. The SDCCH channel is released by the central site (205) upon receiving a communicated signal resource allocation for the inter-cell communicated signal as above.

Paging requests from the central site (205) are transferred to the remote base sites (60, 61, 62, 63, 64, or 65) by first transmitting a resource request to the remote base site (60, 61, 62, 63, 64, or 65) followed by the exchange of control information on a SDCCH granted for such exchange. SDCCH channels granted in support of paging may be retained by the remote base site (60, 61, 62, 63, 64, or 65) for a time period pending a response from a target unit or immediately released. If immediately released, then a remote site (60, 61, 62, 63, 64, or 65) receiving a response from a target communication unit would transmit a page to the central site (205) followed by a SDCCH grant on the CCCH re-establishing the control link for channel set-up.

The means for determining the need for a signal exchange within the site controller (301) comprises a software routine providing a search algorithm for interrogating communication units (16, 17, or 18) within the service coverage area (50 through 56) served by the site controller (301) and determining the need for a signal exchange based upon an absence of a response from a target communication unit (16, 17, or 18).

In another embodiment of the invention the communication resource allocated by the remote site (63) for communication with the central site (205) is operated as a high speed link exchanging information between the remote site (63) and the central site (205) at a rate that is a multiple of a base transfer rate used between the remote site and the communication unit (18). The high speed link is then used to service a number of communication transactions, simultaneously, from the remote site (63) on the same communication resource, which number of transactions is equal to the multiple of the high speed link divided by the base transfer rate.

The high speed data link between remote sites (60, 61, 62, 63, 64, or 65) may be achieved by a suitable encoding technique for a backbone communication network involving inter-cell communications between remote base sites (60, 61, 62, 63, 64, or 65) and the central site (205). The unique and relaxed requirements for encoding information for inter-cell slots used for point-to-point (central site to remote site) allows for considerable flexibility in the slot's actual composition in comparison to GSM uplink and downlink requirements. For example, it is not necessary that inter-cell traffic be error correction coded since the degree of error protection needed over the relatively high quality, stationary backbone link is reduced. In GSM, the difference in error corrected coding and non-error corrected coding relates to 22.8 kb/s versus 13 kb/s. Other sources of reduced inter-cell traffic (increased capacity) include increasing the modulation of an encoded signal, through the elimination of tail bits, some sync bits, flag stealing bits, etc. As such it is possible to encode more than a single traffic channel and or to combine traffic and signalling information into fewer backbone, inter-cell slots.

In one embodiment of the invention, the high speed link for inter-cell communications uses a high order modulation technique to enhance the channel capacity for communicating backbone information. The high order modulation technique allows an increase in the subscriber capacity improving the economics and viability of the technique. In the case of inter-cell communication eight-level multi-shift frequency keying (FSK) may be used since it is easy to generate and decode and, being a constant envelope modulation technique, is compatible with typical system operation and prior-art GSM equipment.

The ability to utilize such an enhanced modulation technique (such as eight level FSK) requiring a stronger signal level for backbone slots is justified because the point-to-point, backbone link is not subject to the rapid fade normally associated with an uplink channel. Fixed site locations can also be easily selected and/or constructed to have a line-of-site transmission paths thereby providing additional signal to noise advantage. In this way, the particular modulation used for each function is tailored for its particular radio path application—fixed or mobile. Selection based upon function allows maximizing the capacity throughput (thereby minimizing cost) for the non faded stationary, point-to-point carrying capacity of inter cell communications.

Inter-cell timing within the communication system may be controlled by the central site (205). In such an embodiment control links and/or communicated signals may be exchanged between the central site (205) and the remote base sites (60, 61, 62, 63, 64, or 65) on successive time slots and be serviced from a single transceiver (201, 202, 203, or 204).

Figure 5:
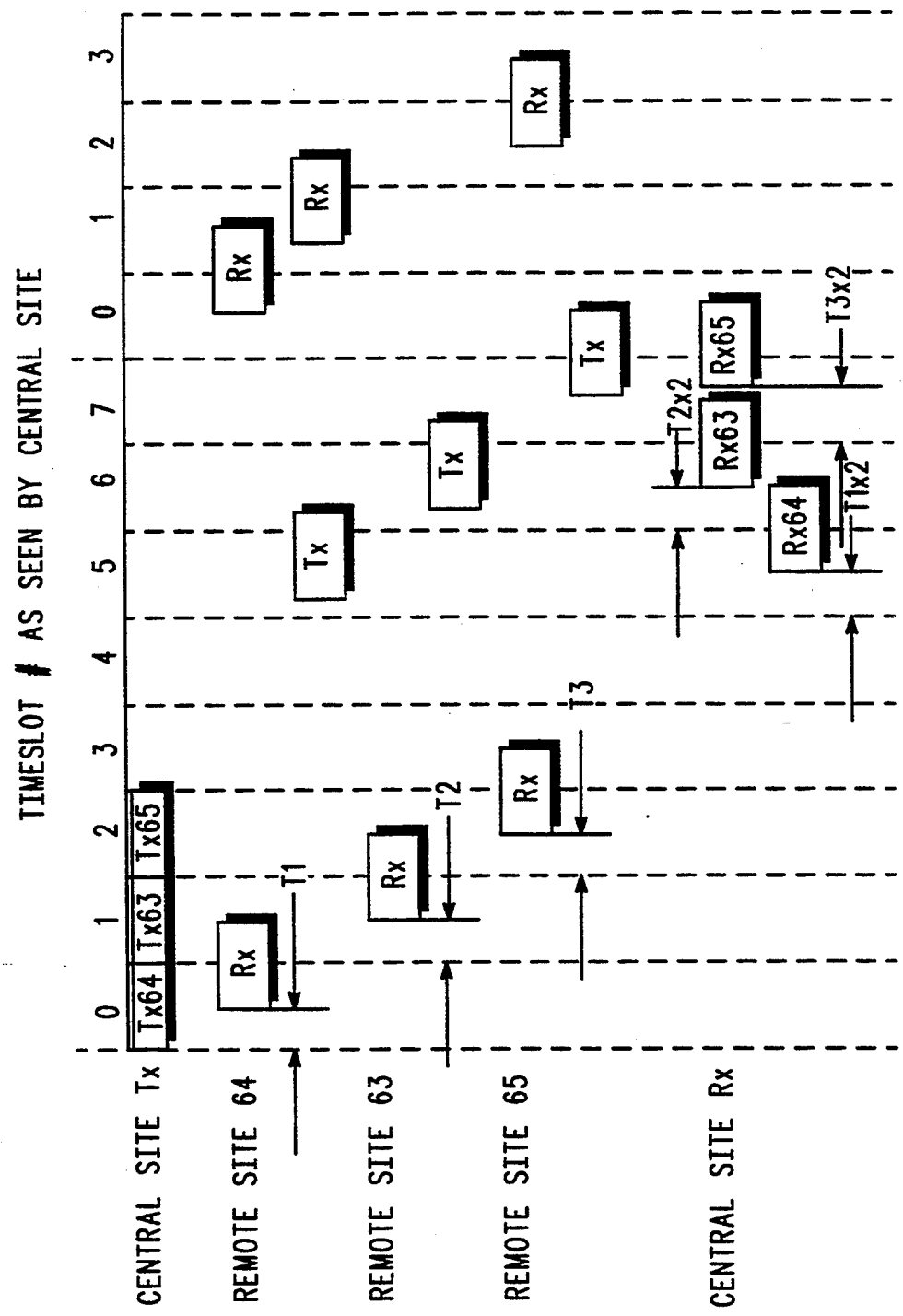
FIG. 5 comprises a timing diagram of central site TDM signals transceived on a communication resource under the invention.

Shown (FIG. 5) is a TDM timing diagram for the above examples (a requestor (16) in remote site 64 in contact with a target (17) in remote site 65 and requestor (18) in contact with a PSTN subscriber (not shown)). Remote site 64 occupies slots 0 and 5 for transmission and reception, remote site 63 occupies slots 1 and 6, and remote site 65 occupies slots 2 and 6.

Remote sites (63, 64, and 65) synchronize (FIG. 5) to transmissions from the central site (205). The reference in FIG. 5 (Central Site Tx) is a transmission (Tx) in each time slot, in phase with the time slot. As shown (FIG. 5) a transmission (Tx) from the central site (205) in slot 0 is received (Rx) at remote site 64 after a transmission time delay of t1. Similarly a transmission (Tx) in time slot 1 and 2 to remote site 63 and 65 is received (Rx) after time delays t2 and t3. Transmissions received at the central site (205) from the remote sites (60, 61, 62, 63, 64, or 65) are similarly displaced by transmission delays. Total transmission time delay on a signal received from remote site 64 is t1 x2. Total time delay for remote sites 63 and 65 is t2 x2, and t3 x2, respectively.

Remote sites (60, 61, 62, 63, 64, or 65) adjust the timing of transmissions to the central site (205) through the use of interslot timing commands transmitted by the central site (205) to the remote sites (60, 61, 62, 63, 64, or 65) in a manner similar to the ETSI GSM algorithm used by GSM mobile communication units. The ETSI GSM algorithm reduces (advances) the interslot timing (time between receive and transmit) at remote sites based upon timing information transmitted from the central site (205) to the remote sites (64, 65, and 63).

Figure 6:
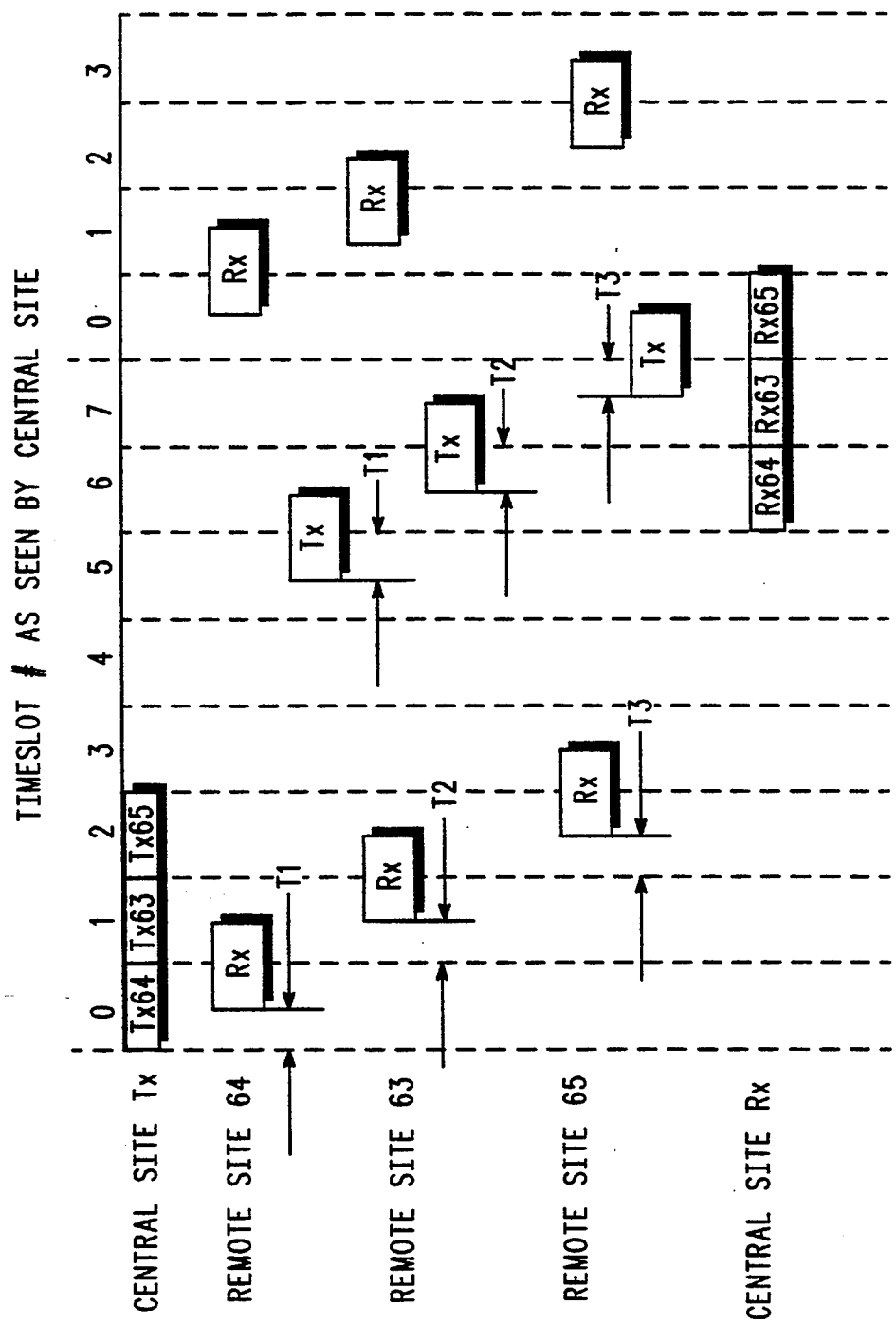
FIG. 6 comprises a timing diagram of central site TDM signals transceived on a communication resource using timing advance signals under the invention.

In the case of remote site 64 the central site (205) measures a time offset (in slot 5) of t1 x2 on a signal received from remote site 64 in response to a signal transmitted in slot 1. Upon measuring the offset of t1 x2 the central site (205) transmits commands to remote site 64 reducing the interslot timing between receive (slot 1) and transmit (slot 5) by a time interval of t1 x2 to compensate for transmission delays. The central site (205), likewise, transmits commands to remote site 63 and 65 reducing interslot timing by t2 x2 and t3 x2, respectively. As shown (FIG. 6) use of the ETSI GSM algorithm allows for reduced incidence of signal collision at the central site (205).

In another embodiment of the invention the central site (205) functions as a system tester of remote base sites (60, 61, 62, 63, 64, or 65). The central site (205) may test remote base site (60, 61, 62, 63, 64, or 65) operation by emulating the transmissions of a communication unit (16, 17, and 18) thereby testing and verifying remote site operation. In such a case the central site (205) may transmit a resource request to a remote site (60, 61, 62, 63, 64, or 65) using a fictional ID of a test communication unit (not shown) to verify remote site (60, 61, 62, 63, 64, or 65) call set-up procedures. The central site (205) may also transmit a fictional paging message to a remote base site (60, 61, 62, 63, 64, or 65) and then monitor the CCCH of the remote site (60, 61, 62, 63, 64, or 65) for a transmitted page.

The central site may also test remote site (60, 61, 62, 63, 64, or 65) operation through the transmission of executive commands initiating test routines over an allocated resource requested for that purpose. Such commands may initiate specialized test routines or capabilities provided within the remote base site (60, 61, 62, 63, 64, or 65). For example, the remote base site (60, 61, 62, 63, 64, or 65) could be requested to enter a loop around mode, report local status or measurements, and/or enter other diagnostic modes.

We claim:

1. A method of exchanging communicated signals within a communication system between a remote base site and a central site on a communication resource of a plurality of communication resources assigned to the remote base site for exchanging signals with communication units in a coverage area of the remote base site, such method including the steps of:
   A) determining that a signal must be exchanged between the remote base site and the central site; and
   B) allocating the communication resource by the remote base site for exchanging communicated signals between the remote base site and the central site.

2. The method as in claim 1 wherein the step of determining that a communicated signal must be exchanged between a remote base site and the central site further includes the steps of receiving and decoding by the remote base site of a request from a communication unit requiring access to the central base site.

3. The method as in claim 1 further including the step of transmitting an access request to the central site.

4. The method as in claim 1 wherein the step of determining that a communicated signal must be exchanged between a remote base site and the central site further includes the steps of receiving and decoding a request from a PSTN subscriber for access to a target communication unit serviced by the remote base site.

5. The method as in claim 4 further including the step of transmitting an access request to the remote base site.

6. The method as in claim 1 further including the step of adjusting an interslot timing by communicated timing commands transmitted by the central site to the remote base site.

7. The method as in claim 1 further including the step of initiating test routines within the remote base site by the central site.

* * * * *